United States Patent
Kerem et al.

(10) Patent No.: US 8,954,409 B1
(45) Date of Patent: Feb. 10, 2015

(54) ACQUISITION OF MULTIPLE SYNCHRONIZATION OBJECTS WITHIN A COMPUTING DEVICE

(75) Inventors: Oren Kerem, Sunnyvale, CA (US);
Jeffrey G. Libby, Cupertino, CA (US);
Deepak Goel, Sunnyvale, CA (US);
David J. Ofelt, Los Gatos, CA (US);
Anurag P. Gupta, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 603 days.

(21) Appl. No.: 13/240,259

(22) Filed: Sep. 22, 2011

(51) Int. Cl.
*G06F 17/00* (2006.01)

(52) U.S. Cl.
USPC ........... 707/704; 707/722; 707/736; 707/758; 726/2

(58) Field of Classification Search
None
See application file for complete search history.

(56) References Cited

U.S. PATENT DOCUMENTS

| | | | |
|---|---|---|---|
| 5,408,629 A * | 4/1995 | Tsuchiya et al. | 711/151 |
| 5,623,659 A * | 4/1997 | Shi et al. | 1/1 |
| 5,678,026 A * | 10/1997 | Vartti et al. | 711/152 |
| 5,692,178 A * | 11/1997 | Shaughnessy | 1/1 |
| 5,761,659 A * | 6/1998 | Bertoni | 1/1 |
| 5,940,841 A * | 8/1999 | Schmuck et al. | 1/1 |
| 5,956,712 A * | 9/1999 | Bennett et al. | 1/1 |
| 6,021,508 A * | 2/2000 | Schmuck et al. | 714/4.5 |
| 6,101,569 A * | 8/2000 | Miyamoto et al. | 710/200 |
| 6,108,654 A * | 8/2000 | Chan et al. | 1/1 |
| 6,449,614 B1 * | 9/2002 | Marcotte | 1/1 |
| 6,772,155 B1 * | 8/2004 | Stegelmann | 1/1 |
| 7,120,631 B1 * | 10/2006 | Vahalia et al. | 1/1 |
| 7,181,104 B2 * | 2/2007 | Doerr | 385/27 |
| 7,222,119 B1 * | 5/2007 | Ghemawat et al. | 1/1 |
| 7,228,391 B2 * | 6/2007 | Silvera et al. | 711/152 |
| 7,293,011 B1 * | 11/2007 | Bedi et al. | 1/1 |
| 7,444,634 B2 * | 10/2008 | Jeyaram | 718/104 |
| 7,734,604 B1 * | 6/2010 | Sinclair et al. | 707/704 |
| 7,739,245 B1 * | 6/2010 | Agarwal et al. | 707/687 |
| 7,809,916 B1 * | 10/2010 | Shavit et al. | 711/170 |
| 7,975,271 B2 * | 7/2011 | Anderson | 718/104 |
| 8,316,370 B2 * | 11/2012 | Dai et al. | 718/103 |
| 8,364,677 B2 * | 1/2013 | Brodfuehrer et al. | 707/737 |
| 2004/0088573 A1 * | 5/2004 | Jeyaram | 713/201 |
| 2004/0107227 A1 * | 6/2004 | Michael | 707/206 |
| 2005/0010729 A1 * | 1/2005 | Silvera et al. | 711/150 |
| 2005/0251500 A1 * | 11/2005 | Vahalia et al. | 707/1 |
| 2006/0225077 A1 * | 10/2006 | Anderson | 718/104 |
| 2010/0083257 A1 * | 4/2010 | Zhu et al. | 718/101 |
| 2010/0083266 A1 * | 4/2010 | Dai et al. | 718/103 |

OTHER PUBLICATIONS

U.S. Appl. No. 13/239,774, by John Keen, filed Sep. 22, 2011.

* cited by examiner

*Primary Examiner* — Hung Le
(74) *Attorney, Agent, or Firm* — Shumaker & Sieffert, P.A.

(57) ABSTRACT

In general, techniques of the present disclosure relate to synchronizing concurrent access to multiple portions of a data structure. In one example, a method includes, sequentially selecting a plurality of requests from a request queue, wherein at least one of the requests specifies a plurality of requested synchronization objects for corresponding candidate portions of a data structure to which to apply an operation associated with a data element. The method also includes querying one or more sets of identifiers to determine whether one or more of the requested synchronizations objects specified by the selected request are acquirable. The method also includes acquiring each of the requested synchronization objects that are acquirable. The method includes, responsive to acquiring all of the one or more requested synchronization objects, selecting a subset of the candidate portions of the data structure and applying the operation only to the selected subset of the candidate portions.

29 Claims, 5 Drawing Sheets

ACQUISITION OF MULTIPLE SYNCHRONIZATION OBJECTS WITHIN A COMPUTING DEVICE

TECHNICAL FIELD

The invention relates to synchronization techniques and, more particularly, to synchronizing concurrent operations performed on a data structure.

BACKGROUND

Synchronization objects, such as locks or semaphores, are used within computing systems to control access to shared resources, such as data structures. One example type of data structure, referred to as hash tables, is generally used to provide a unique mapping between a set of input values, referred to as key values, and storage locations for corresponding output values, referred to as buckets. Hash tables are used in various contexts, such as, database applications, implementing data structures such as associative arrays and sets, memory caches, networking applications, or other situations in which a unique mapping between input values and output values is desirable.

One technique to increase the speed of hash tables is to provide a hardware-based hash table. When a hash table is implemented in hardware, the hash table may perform one or more operations concurrently on multiple "buckets" or portions of the hash table. Thus, multiple processes and/or threads may request access to the hash table to insert, delete or look up data in the hash table. If, for example, multiple threads attempt to simultaneously modify data stored in a bucket of the hash table, the data may become inconsistent or deadlock may occur between the threads. In such cases, synchronization object, e.g., a locks, may be associated with the buckets of the hash table to avoid deadlock and ensure data consistency. A lock restricts access to a resource such as a bucket in a hash table by allowing only a single thread at a point in time to modify data in the bucket. In many cases, multiple threads may each request multiple buckets in a hash table. Multiple buckets may also be locked within a hash table a point in time as multiple operations are performed simultaneously on the hash table. As the number of requests increase for locks of multiple buckets, trade-offs may occur between performance, fairness, and data integrity.

In the past, only a single software resource was able to write to a data structure such as a hash table at a point in time. This property preserved integrity and coherence of the data stored within the hash table. In multithreaded and multiprocess environments, synchronization objects such as locks were used to ensure that only a single thread or process was able to write to the hash table at a point in time. For example, when a lock was obtained by a thread, no other threads could perform insert or delete operations on the hash table. Consequently, all other processes and threads were "blocked" and therefore were required to wait until the lock was released before performing insert or delete operations. When the lock was released, another thread would acquire the lock and perform one or more operations on the hash table. In this way, only a single thread or process could modify the hash table.

SUMMARY

In general, techniques of the present disclosure relate to synchronizing concurrent operations performed on multiple portions of a data structure. In one aspect of the disclosure, a data structure (e.g., a hash table) may perform multiple operations concurrently on multiple different portions (e.g., buckets) of the data structure. To synchronize multiple operations performed on different portions of the data structure while providing fairness, requests to access the data structure may be stored in a queue and sequentially processed. Each request in the queue specifies one or more portions of the data structure into which data may be stored or deleted. Synchronization objects such as locks are associated with each of the portions of the data structure to provide data integrity and avoid deadlock when the data structure performs multiple operations concurrently on different portions of the data structure.

A manager module implementing techniques of the disclosure iteratively traverses the queue in sequential order from the head of the queue to the tail of the queue, selecting each request to determine whether locks specified by the selected request are acquirable. To determine whether locks are acquirable, the manager module queries a table that indicates which portions of the data structure are currently locked. If one or more of the locks specified in the request are acquirable, the manager module acquires the locks for the selected request. When all of the locks specified by the request are acquired, the operations specified by the request may then be performed concurrently on the multiple portions of the data structure. In some examples, one or more specified locks of a request are not acquirable when the manager queries the table. In such examples, the manager module sequentially selects the next request in the request queue and determines if locks specified by the subsequently selected request are acquirable. By iteratively traversing the queue in sequential order, techniques of the present disclosure provide fairness and avoid deadlock while enabling a data structure to perform multiple operations concurrently on multiple different portions of the data structure.

In one example, a method includes sequentially selecting, by a computing device, a a plurality of requests from a request queue. At least one of the requests specifies a plurality of requested synchronization objects. corresponding candidate portions of a data structure to which to apply an operation associated with a data element. The method also includes querying, by the computing device, one or more sets of identifiers to determine whether one or more of the requested synchronizations objects specified by the selected request are acquirable, wherein the identifiers identify the synchronization objects of the set of synchronization objects. The method further includes acquiring, by the computing device, each of the requested synchronization objects that are acquirable. The method also includes, responsive to acquiring all of the one or more requested synchronization objects, selecting, by the computing device, a subset of the candidate portions of the data structure and applying the operation only to the selected subset of the candidate portions.

In another example, a computing device includes a control unit having one or more hardware-based microprocessors and a manager module executable by the microprocessors. The manager module sequentially selects a plurality of requests from a request queue. At least one of the requests specifies a plurality of requested synchronization objects for corresponding candidate portions of a data structure to which to apply an operation associated with a data element. The manager module queries one or more sets of identifiers to determine whether one or more of the requested synchronizations objects specified by the selected request are acquirable, wherein the identifiers identify the synchronization objects of the set of synchronization objects. The manager module acquires each of the requested synchronization objects that are acquirable. Responsive to acquiring all of the one or more requested synchronization objects, selecting, by the microprocessors, a subset of the candidate portions of the data structure and applying the operation only to the selected subset of the candidate portions.

In another example, a non-transitory computer-readable memory includes instructions that, when executed, cause one or more processors to: sequentially select a plurality of requests from a request queue. At least one of the requests specifies a plurality of requested synchronization objects for corresponding candidate portions of a data structure to which to apply an operation associated with a data element. The non-transitory computer-readable memory also includes instructions that, when executed, cause one or more processors to query one or more sets of identifiers to determine whether one or more of the requested synchronizations objects specified by the selected request are acquirable. The identifiers identify the synchronization objects of the set of synchronization objects. The non-transitory computer-readable memory also includes instructions that, when executed, cause one or more processors to acquire each of the requested synchronization objects that are acquirable. The non-transitory computer-readable memory also includes instructions that, when executed, cause one or more processors to, responsive to acquiring all of the one or more requested synchronization objects, selecting a subset of the candidate portions of the data structure and applying the operation only to the selected subset of the candidate portions.

A computing device comprising: a control unit having one or more hardware-based microprocessors; a manager module executable by the microprocessors, and a hash engine executable by the microprocessors. The hash engine applies a plurality of hashing functions to a data element to generate a plurality of identifiers that identify candidate portions of a hash table to write the data element. The manager module sequentially selects a plurality of requests from a request queue, wherein at least one of the requests specifies a plurality of locks for corresponding candidate portions of the hash table to which to apply an operation associated with the data element. The manager module queries one or more sets of identifiers to determine whether one or more of the requested locks specified by the selected request are acquirable. The identifiers identify the locks of the plurality of locks. The manager module acquires each of the requested locks that are acquirable. The computing device also includes a filter component that, responsive to acquiring all of the one or more requested locks, selects, by the microprocessors, a subset of the candidate portions of the hash table and writes the data element only to the selected subset of the candidate portions. The details of one or more embodiments of the invention are set forth in the accompanying drawings and the description below. Other features, objects, and advantages of the invention will be apparent from the description and drawings, and from the claims.

DETAILED DESCRIPTION

Figure 1:
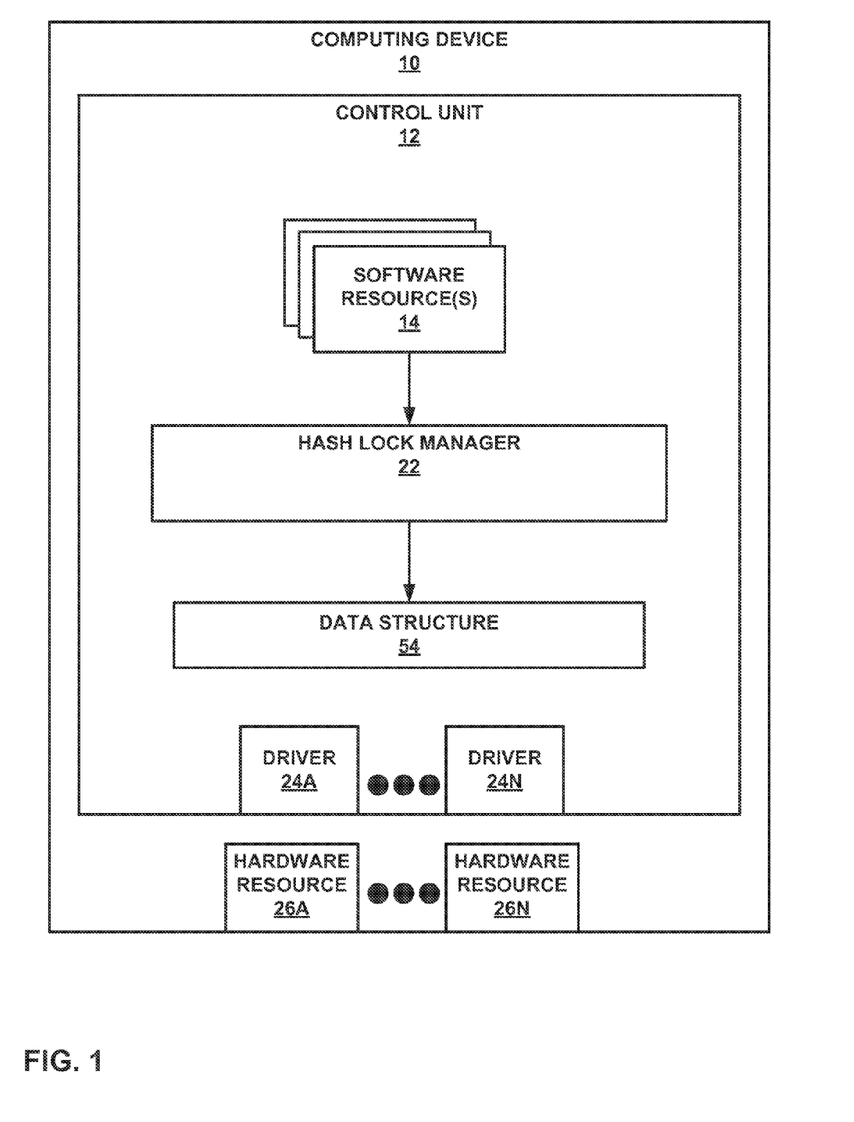
FIG. 1 is a block diagram illustrating an example computing device that implements synchronization techniques described in this disclosure.

FIG. 1 is a block diagram illustrating an example computing device 10 that implements synchronization techniques described in this disclosure. Computing device 10 may be a personal computer, a laptop computer, a handheld computer, a mobile telephone, a server, a workstation, an intermediate network device, a data storage system, a supercomputer, a mainframe computer, a device built into a vehicle such as a truck, car, aircraft, watercraft, spacecraft, or other type of electronic device. Computing device 10 may also be any one or more of a number of network devices that utilize one or more internal computing systems, such as a router, a switch, secure socket layer (SSL) acceleration device, a transport layer security (TLS) accelerator device, a virtual private network (VPN) accelerator device, a SSL-VPN accelerator device, a hub, a wide area network (WAN) acceleration (X) device (which is often referred to as a "WX device"), or any other network device that includes limited resources and is capable of executing multiple tasks, as will be explained in further detail below.

As shown in the example of FIG. 1, computing device 10 includes a control unit 12 and a plurality of hardware resources 26A-26N ("hardware resources 26"). Control unit 12 may generally represent hardware, which in some instances may execute software in the form of instructions stored to a computer readable medium. For example, control unit 12 may comprise any combination of one or more of processors, Application Specific Integrated Circuits (ASICs), integrated circuits or any other processing or control unit or element or combination thereof, and a memory or storage device. In some instances, the memory or storage device (e.g., generally, a computer-readable storage medium) may include the above described instructions that cause the programmable processor to perform the techniques described herein. These instructions may form a computer or software program or other executable module that the programmable processor executes to perform the functionality described herein, including the functionality attributed to the techniques of this disclosure.

In this respect, control unit 12 comprises a plurality of processing elements. The processing elements include one or more of a general purpose processor, a programmable processor and central processing unit (CPU), more dedicated processing elements, such as a network processing unit (NPU) and graphics processing unit (GPU), entirely dedicated processing elements, such as a field programmable gate array (FPGA) and an application specific integrated circuit (ASIC), or any combination of the above.

Control unit 12 provides an operating environment in which a plurality of software resources 14 (e.g., software processes or threads) execute and interact with other components of computing device 10, such as hardware resources 26 and data structure 54, using one or more interfaces, often provided by an operating system. For example, software resources 14 may invoke various operations to interact with and/or modify data within data structure 54. During this process, hash lock manager 22 may be used to control operations applied to data structure 54, as described in further detail below. As shown in FIG. 1, software resources 14 may include any software program or module executable by control unit 12. For example, software resources 14 may include modules comprising instructions that cause computing device 10 to transfer, drop, encrypt or otherwise process network packets. In other examples, software resources 14 may be a web browser application, software library, or word processor application.

Each of hardware resources 26 generally represents a hardware component that performs one or more particular functions or operations. Hardware resources may be general resources such as physical memory or input/output devices, or specialized hardware components. For example, hardware resource 26A may comprise dedicated SSL accelerator hardware that only performs SSL acceleration to accelerate forwarding of packets requiring SSL encryption or decryption, or the successor of SSL, TSL encryption and decryption (as SSL acceleration devices may be referred to as SSL acceleration devices despite implementing the successor to SSL, TSL). In any event, each of hardware resources 26 performs one or more particular functions or operations, including SSL acceleration, TSL acceleration, WAN acceleration (X) or WX, compression, intrusion detection, and intrusion detection and prevention (IDP). Other examples of hardware resources include a modem, memory, output device such as a monitor, or input device such as a mouse or keyboard.

Drivers 24 generally represent software modules that present an interface with which other software, such as software resources 14 may send and receive information to hardware resources 26. Typically, each of drivers 24 corresponds to a different one of hardware resources 26 and may be part of an operating system of computing device 10. That is, in one example, an operating system executing within control unit 12 may load drivers 24 during boot-up or power-up so as to initialize and enable each of hardware resources 26 for use by software, such as software resources 14.

In some examples, software resources 14 are configured to store data in data structure 54. Data structure 54 may be implemented in hardware or software. For instance, data structure 54, in one example, is a hash table implemented in hardware. In such examples, software resource 14 inserts, deletes, and/or looks up data within data structure 54. Data structure 54, in some examples, stores data in array elements or "buckets." Different buckets of a data structure may be referred to as different "portions" of the data structure throughout this disclosure. In one example, software resource 14 may generate a request to store data in data structure 54. Prior to storing data in data structure 54, a hash function is applied to the data to generate an index value that identifies the bucket of data structure 54 into which the data is stored. The hash function identifies a bucket of data structure 54 in which to store the data based on a key associated with the data that further uniquely identifies the data. In this way, data values may be stored in and retrieved from the hash table. The aforementioned hashing techniques are further described in FIG. 2.

Advancements in computer hardware and software design have produced data structures, e.g., data structure 54, which can perform multiple operations concurrently on multiple portions of a data structure. For instance, Content Addressable Memory (CAM) includes semiconductor memory and comparison circuitry that can perform multiple operations on memory contents in a single clock cycle. Thus, if a hash table is implemented in CAM, multiple operations may be performed concurrently on different portions of the hash table. For instance, multiple insert and delete operations may be performed concurrently on different buckets of a hash table.

Techniques of the disclosure may also be applied to other memory structures that allow for multiple operations to proceed in parallel. For instance, if a hash table is too large to be stored in a CAM, the hash table may be stored in external Dynamic Random Access Memory (DRAM) modules. Read/write operations generated by hash engines may be sent to DRAM controllers that control the DRAM modules and perform the DRAM reads/writes. If operations on external DRAM require multiple clock cycles to complete, multiple read/write requests may attempt to access the DRAM at the same time. Techniques of the disclosure may enable synchronization of multiple parallel hash engine operations while avoiding deadlock when operations are waiting for external memory accesses of other processes to complete.

Techniques of the present disclosure use multiple synchronization objects to provide fairness, data integrity, and data coherence when performing concurrent operations within a data structure. Such techniques may be implemented in a hash lock manager 22 as shown in FIG. 1 and further described in FIGS. 2-5. Because multiple portions, e.g., buckets, of data structure 54 can be modified concurrently, techniques of the present disclosure use multiple synchronization objects to control access to each bucket of data structure 54. Thus, in some examples, techniques of the present disclosure associate each bucket of data structure 54 with a synchronization object such as a lock. In this way, only a single software resource can perform an insert or delete operation on a bucket of data structure 54 at a point in time, i.e., when the software resource has acquired the lock. Consequently, techniques of the present disclosure enable parallel insertion and deletion of data on data structure 54 while providing data integrity and coherence.

The present disclosure further includes techniques, implemented by hash lock manager 22, which provide for fair management of multiple locks. Lock requestors, such as processes or threads of software resources 14, may request multiple locks. When hash lock manager 22 grants all of the requested locks to a lock requestor, hash lock manager then grants the lock requestor access to perform operations on portions of data structure 54 that correspond to the requested locks. In this way, hash lock manager 22 may provide for fair management of locks such that no lock requestor is starved. Moreover, techniques of the present disclosure avoid deadlock, i.e., when two or more lock requestors each wait for the other to release a lock.

In one example, hash lock manager 22 maintains a request queue of requested operations. Each request corresponds to a lock requestor that is presently waiting to acquire one or more locks, where each lock corresponds to one of a plurality of operations that can be carried out concurrently on data structure 54. For example, a request to concurrently perform four write operations to the hash table specifies a need to acquire four locks. Hash lock manager 22 inserts new requests into the tail of the request queue. Hash lock manager 22 may evaluate the request queue from head to tail, selecting one request at a time to check the availability of the locks specified in the request. If any of the requested locks are available, hash lock manager 22 allows the request to acquire the one or more available locks. Once all the locks have been acquired for a given request, control unit 12 removes the request from the request queue and concurrently executes the number of operations specified by the request on different portions of data structure 54. In this way, hash lock manager 22 provides fairness by granting requests access to the locks in the order that the requests occur within the request queue.

After the lock requestor has completed its operations, the lock requestor generates a lock-free event, which is sent to hash lock manager 22. The lock-free event causes hash lock manager 22 to free the locks specified by the lock-free event. In some examples, if hash lock manager 22 has only partially evaluated request queue when hash lock manager 22 receives the lock-free event, hash lock manager 22 buffers and delays the processing of the lock-free event until hash lock manager has finished evaluating the request queue. When hash lock manager 22 finishes evaluating the request queue, the lock-free event is then processed by hash lock manager 22 to release the locks. In this way, if a lock-free event occurs while hash lock manager 22 is evaluating the request queue, a subsequent request cannot acquire a lock before a previous request. This technique may improve fairness and avoid deadlock and starvation of lock requestors. When hash lock manager 22 subsequently evaluates the request queue, earlier requests are allowed to acquire the recently freed locks before later requests stored in the request queue. Techniques of the present disclosure are further described in FIGS. 2-5.

Figure 2:
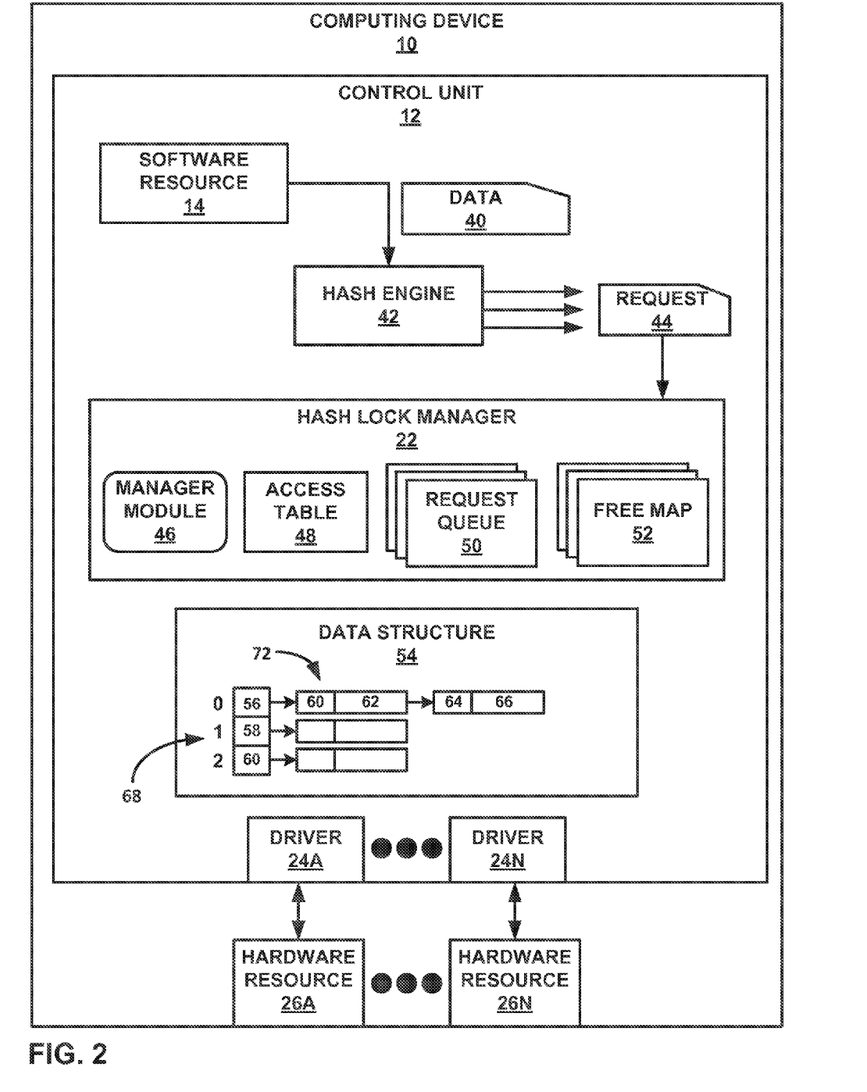
FIG. 2 is a block diagram illustrating a hash lock manager that implements synchronization techniques described in this disclosure.

FIG. 2 is a block diagram illustrating an example embodiment of computing device 10 in further detail, including hash lock manager 22 that implements synchronization techniques described in this disclosure for controlling access to data structure 54. As shown in FIG. 2, computing device 10 includes control unit 12 and hardware resources 26 as previously described in FIG. 1. Control unit 12 also includes software resource 14, hash lock manager 22, data structure 54, and drivers 24 as described in FIG. 1. As shown in FIG. 2, control unit 12 further includes hash engine 42, data 40, and request 44. Hash lock manager 22 further includes manager module 46, access table 48, request queue 50, and free map 52.

As previously described in FIG. 1, software resource 14 may include executable software instructions that cause control unit 12 to perform operations that modify data structure 54. In examples where data structure 54 is a hash table, software resource 14 may invoke hash table operations such as insert, delete, and look up. An insert operation stores data 40 in an entry of data structure 54, while a delete operation deletes an entry, e.g., entry 72, from data structure 54. A lookup instruction requests a data value stored in data structure 54 based on a key value as further described herein.

As shown in FIG. 2, control unit 12 includes a hash engine 42, which may be implemented in hardware. Hash engine 42 may apply one or more hashing functions to perform hashing operations to access data structure 54 at the request of software resources 42. For instance, to store data 40 in data structure 54, software resource 14 may initially output a write request and a data value, from which hash engine 42 may assign a key as a unique identifier that identifies data 40. Hash engine 42 applies one or more hashing functions to the key to generate one or more index values. Each index value identifies a bucket within data structure 54 to which to store data 40. Hash engine 42 stores the key and data 40 into the one or more buckets identified by the computed index values. In some examples, a bucket may store multiple data values and corresponding keys that have been hashed to that particular bucket. In such examples, data structure 54 stores each key/data value pair in an entry of a bucket. In this way, a bucket may store multiple entries and therefore multiple data values. Because each data value is identified by a key, each data value may later be identified in a delete or lookup operation.

As shown in the example of FIG. 2, data structure 54 may be a hash table having buckets, of which buckets 56-60 are shown as each identified by index values 60 having values of "0-2". Each bucket further includes one or more entries such as entry 72. In one example, an entry is an object that stores a key and data value. Entry 72, for example, includes key 60 and corresponding data value 62. Multiple entries may be stored in a bucket using a data structure such as a linked list of entries as shown in the example of FIG. 2.

As described in FIG. 1, data structure 54 may be implemented in hardware such as a CAM. Because a data structure implemented in hardware may have a finite number of entries per bucket, hash engine 42 may not store a data value in a bucket that is full (i.e., the bucket has no free entries to store data values). Hash engine 42 may also implement techniques to improve dispersion of data values in buckets of data structure 54. For instance, techniques of the present disclosure may apply multiple, different hash functions to a key of a data value in order to generate multiple, different index values. The index values may correspond to multiple, different candidate buckets, e.g., candidate portions, in data structure 54. When hash engine 42 later performs an insert operation to store the data value associated with the key in data structure 54, a filter component may further select a subset of the multiple index values and store the data value in selected buckets corresponding to the subset of selected index values. For instance, the filter component may not store a data value in any bucket that is full. In other examples, the filter component may select a bucket that provides the greatest increase in dispersion of data values in data structure 54. In any case, the filter component selects a subset of index values of candidate buckets into which the data value is stored. By acquiring all of the locks prior to the filter component selecting a subset of buckets, techniques of the present disclosure may provide fairness by preventing later requests from acquiring one or more of the locks as the filter component selects the buckets. Similar techniques may be applied to delete data values in buckets using a filter component.

As described in FIG. 1, techniques of the present disclosure use multiple synchronization objects such as locks to provide data integrity and coherence in data structure 54. For instance, when hash engine 42 performs an insert operation to store a data value in a bucket of data structure 54, hash engine 42 acquires the lock for the corresponding bucket prior to performing the insert operation. Similarly, when hash engine 42 generates multiple index values using multiple hash functions, hash engine 42 may acquire locks for each of the buckets corresponding to the generated index values before performing the insert operation. Control unit 12 may, for example, perform multiple operations of multiple requests concurrently on data structure 54. As such, acquisition of the multiple locks specified by a given request before servicing the request may provide data integrity and coherence in data structure 54.

Hash lock manager 22 implements techniques that provide fairness among lock requestors when such requestors request multiple locks. As shown in FIG. 2, hash lock manager 22 includes manager module 46, access table 48, request queue 50, and free map 52. When software resource 14 initially invokes an operation to store data 40 in data structure 54, hash engine 42 may initially receive data 40. Hash engine 42 then applies multiple hash functions to data 40 as previously described to generate multiple index values. In some examples, hash engine 42 generates a request 40 that includes data 40 and the index values 44. The multiple index values identify buckets of data structure 54 in which to store data 40. Hash engine 42 may send request 44 to hash lock manager 22.

Manager module 46 of hash lock manager 22 may initially receive request 44 and store request 40 in request queue 50. Manager module 46 stores requests that are presently waiting to acquire locks for data structure 54 in request queue 50. When manager module 46 receives a new request that requests one or more locks, manager module 46 adds the request to the tail of request queue 50. Consequently, requests are ordered sequentially in request queue 50 from head to tail in the order in which the requests are received.

Hash lock manager 22 further includes an access table 48. Access table 48 includes index values of buckets in data structure 54 that are currently locked. Each row of access table 48 corresponds to a request included in request queue 50. A row of access table 48 stores one or more index values specified by a request stored in request queue 50. For example, a request in request queue 50 may specify four index values of buckets in data structure 54. Each of the four index values may be stored in a row of access table 48 that corresponds to a request in request queue 50. A lock bit is further associated with each index value stored in access table 48. When a request in request queue 50 acquires a lock for a bucket in data structure 54, manager module 46 identifies the row in access table 48 that corresponds to the request and sets the lock bit associated with the index value in the row.

As shown in FIG. 2, hash lock manager 22 further includes a free map 52. Free map 52 indicates whether a row of access table 48 is currently associated with a request of request queue 50. In one example, free map 52 may be implemented as a vector data structure or bitmap. Each row index of access table 48 corresponds to an element index of free map 52. Thus, if access table 48 includes 64 elements, free map 52 may be implemented as a bitmap with 64 elements. If a row of access table 48 is currently associated with a request in request queue 50, manager module 46 sets the bit of free map 52 corresponding to the row of access table 28 to, e.g., '1' to indicate the row is associated with a request.

Synchronization techniques of the current disclosure are further illustrated in the following example. As previously described, manager module 46 receives requests such as a request 44 from hash engine 42. Manager module inserts request 44 to the tail of request queue 50. Request 44 may specify multiple index values corresponding to buckets in data structure 54. Request 44 must acquire locks for each of the buckets identified by the index values of the request before the one or more operations associated with request 44 can be completed.

When request 44 is initially inserted in request queue 50, manager module 46 determines if a row in access table 48 is free and therefore may be associated with the selected request. To determine if a row is free, manager module 46 queries free map 52 to identify a free row of access table 48. If a row is free in access table 48, manager module 46 stores the index values of the selected request in the free row of access table 48. Responsive to storing the index values in the row of access table 48, manager module 46 sets the bit in free map 52 that corresponds to the row to indicate the row is no longer free. Manager module 46 further stores a row identifier in the selected request that matches the row index of access table 48 that stores the index values of the selected request.

According to techniques of the present disclosure, manager module 46 repeatedly traverses request queue 50 from head to tail selecting each request sequentially to determine whether any of the locks requested by the selected request may be acquired. For instance, manager module 46 initially selects a request at the head of request queue 50. Upon selecting the request, manager module 46 determines whether any of the one or more index values stored in the request are included in access table 48. Manager module 46 then acquires for the selected request any available locks in a greedy manner. For instance, if an index value of the selected requested is stored in a row of access table 48, manager module 46 further determines whether the lock bit associated with the index value is set. If the lock bit is not set, the bucket identified by the index value is not presently locked. Consequently, manager module 46 allows the selected request to acquire the lock. To acquire the lock, manger module 46 selects the row of access table 48 that matches the row identifier associated with the selected request. Manager module 46 then sets the lock bit associated with the index value of the requested bucket in the selected row thereby acquiring the lock for the bucket associated with the index value.

In some examples, manager module 46 determines that one or more index values in the selected request are presently locked by another request in request queue 50. In such examples, manager module 46 cannot acquire all of the locks requested by the selected request at the present time. Consequently, manager module 46 sequentially selects the next request in request queue 50 following the presently selected request. Manager module 46 then determines, as previously described, whether any of the requested locks specified in the next selected request are available. In this way, manager module 46 sequentially traverses request queue 50 allowing requests to greedily acquire free locks as the locks become available. By sequentially traversing request queue 50, hash lock manager 22 provides fairness, avoids deadlock and also provides data integrity and coherence of data structure 54.

In one example, manager module 46 selects a request from request queue 50, and acquires all of the locks associated buckets specified by index values in the request. When all of the locks are acquired by a request, manger module 46 removes the selected request from request queue 50. Control unit 12 then performs the one or more operations specified by the selected request on data structure 54. For instance, if the selected request is an insert operation and four index values are specified for four buckets of data structure 54, control unit 12 may perform an operation concurrently on a subset of selected portions of data structure 54. As previously described, computing device 10 in some examples may include a filter component that selects a subset of the buckets specified by the index values in the request. In such examples, control unit 12 may perform insert operations on the subset of buckets in data structure 54.

Figure 3:
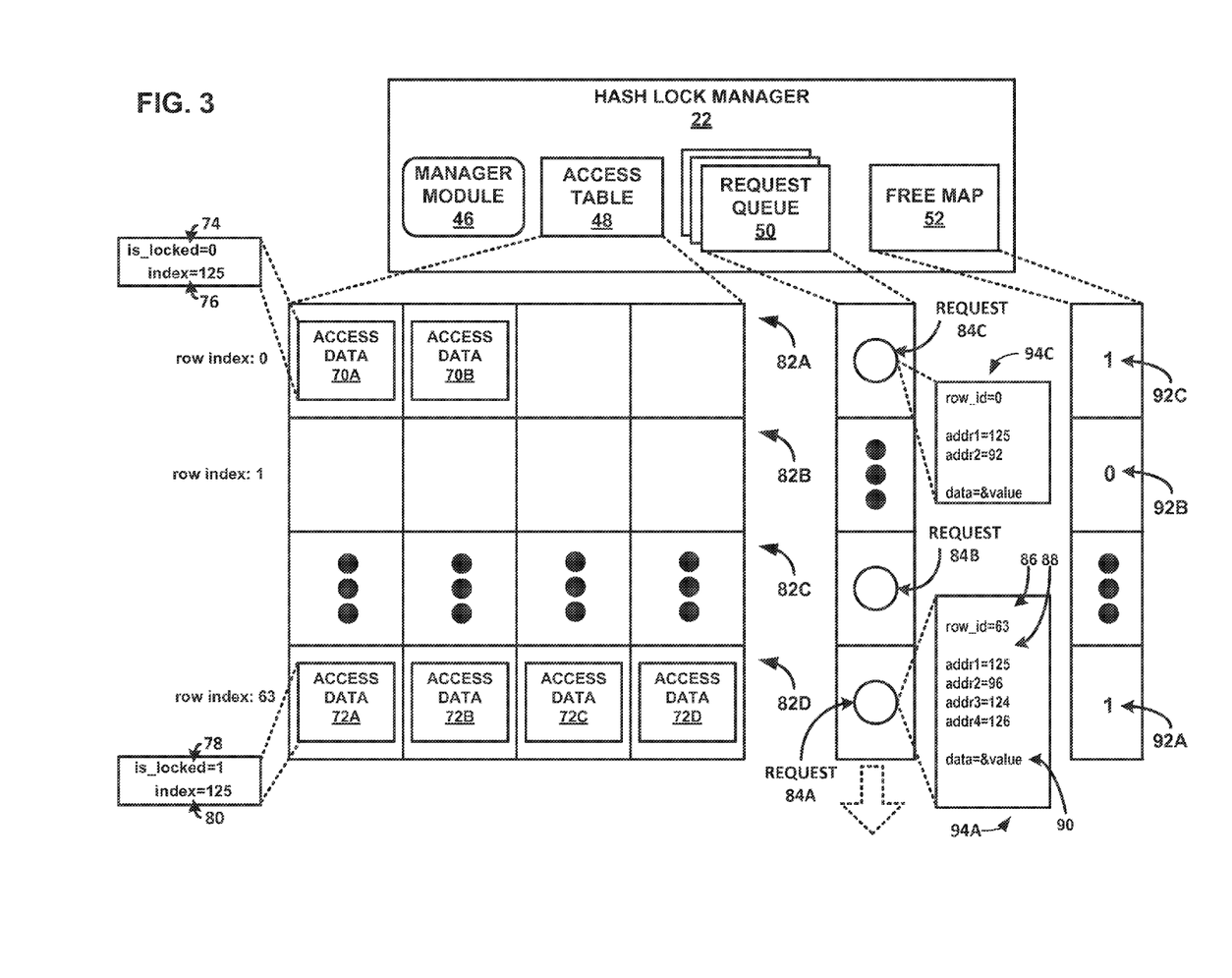
FIG. 3 is a conceptual diagram illustrating a hash lock manager that implements the synchronization techniques described in this disclosure.

FIG. 3 is a conceptual diagram illustrating a hash lock manager that implements the synchronization techniques described in this disclosure. As shown in FIG. 3, hash lock manager 24 includes manager module 46, access table 48, request queue 50, and free map 52 as described in FIG. 2. Access table 48 further includes rows 82A-82D (collectively "rows 82"). Row 82A further includes request data 70A-70B (collectively "request data 70") and row 82D further includes request data 72A-72D (collectively "request data 72"). Request data 70A further includes lock bit 74 and an index value 76. Request data 72A includes lock bit 78 and an index value 80. Request queue 50 also includes requests 84A-84C (collectively "requests 84"). Request 84A further includes row identifier 86, index values 88, and data value 90. Free map 52 further includes bits 92A-92C (collectively "bits 92).

As shown in FIG. 3, hash lock manager 24 receives requests 84 from a hash engine as shown in FIGS. 1-2 and manager module 46 stores requests 84 in request queue 50. Manager module 46 inserts new requests at the tail of request queue 50. In FIG. 3, hash lock manager 24 received request 84A before request 84C. Consequently, request 84A, as shown, is stored at the head of request queue 50 while request queue 84C is stored at the tail of request queue 50.

Each of the requests 84 included in FIG. 3 further include request data 94. As shown in FIG. 3, request 84A includes request data 94A. Request 84C includes request data 94C. In one example, request data includes row identifier 86, one or more index values 88, and data value 90. Row identifier 86 is a row index of access table 48 that corresponds to request 84A. Each row identifier may therefore correspond to a unique request of the request queue. For instance, row 82D of access table 48 corresponds to request 84A and has a row index of 63. Row 82A of access table 48 corresponds to request 84C. Request data 94A further includes index values 88. Each index value corresponds to a bucket in a data structure such as data structure 54 as shown in FIGS. 1 and 2. Index values 88 in request data 90 identify buckets requested by request 84A. Request data 94A further includes data value 90. Data value 90 is data that request 84A specifies will be stored into the buckets of the data structure identified by index values 88. Data value 90 in request 84A may be data sent by a software resource to a hash engine, which in turn includes the data as data value 90 in request 84A FIG. 3 further illustrates access table 48. Access table 48 indicates which buckets of data structure 54, e.g., a hash table, are currently locked. Because multiple operations may be performed on multiple portions of data structure 54, manager module 46 uses access table 48 to determine which buckets are currently locked. Access table 48 includes rows 82. As previously described, each row of access table 48 is associated with a request in request queue 50. Each row 82 of access table 48 stores access data such as access data 70 and access data 72. Access data may include one or more index values that correspond to buckets of data structure 54. Index values stored in access data of a row match index values specified by the request associated that is associated with the row. Each index value is further associated with a corresponding lock bit. If the lock bit associated with the index value is set, the bucket corresponding to the index value is currently locked. Manager module 46 may thus query access table 48 to determine whether a bucket of data structure 54 is currently locked.

FIG. 3 further illustrates free map 52. Free map 52 is a data structure that indicates which rows 82 of access table 48 are currently associated with requests in request queue 50. In some examples, free map 52 is a bitmap implemented as an array of elements 92. Each element 92 of the array may be set to a value of '1' or cleared to a value of '0.' Each element 92 may be accessed by an index which indicates a position of the element within the array. Each index of free map 52 corresponds to a matching value of a row index of access table 48. For instance, element 92C has an index of 0 and corresponds to row 82A having a row index of 0. If a row is presently associated with a request, the corresponding element is set to '1,' and if a row is free, i.e., not associated with a request, the corresponding element is set to '0.'

In accordance with techniques of the present disclosure, manager module 56 iteratively traverses request queue 50, selecting each request in sequential order to determine if any of the requested buckets specified by the requested are acquirable, i.e., not locked. Manager module 46 uses access table 48 to determine if any of the buckets specified in the request are locked and acquires for the selected request any free locks associated with the specified buckets. The following example illustrates the synchronization techniques implemented by hash lock manager 24.

Initially, hash lock manager 24 receives requests 84A, 84B and 84C and inserts the requests into request queue 50 in this respective order such that request 84A is stored at the head of request queue 50 and request 50C is stored at the tail of request queue 50. Upon inserting request 84A in requests queue 50, manager module 46 queries free map 52 to determine if one of rows 82 is free. Request queue 50 may determine that row 82D is free. Consequently, manager module 46 assigns row index 63 to request 84A as row identifier 86. Manager module 46 further sets element 92A of free map 52 to '1' to indicate that row 82D is associated with a request in request queue 50. Manager module 46 also stores index values 88 of request data 94 in access data 72. For instance, index value 125 is stored in access data 72A. Manager module 46 similarly associates row 82A with request 84C and includes index values of request data 94C in row 82A.

Manager module 46 traverses requests 84 sequentially from request 84A at the head of request queue 50 to request 84C at the tail of requests queue 50 to determine whether any requested locks specified by requests 84 are acquirable. For instance, manager module 46 selects request 84A from request queue 50. Manager module 46 selects index values 88 and queries access table 48 to determine if any of the buckets identified by index values 88 are currently locked. For example, manager module 46 queries access table 48 for index value '125' included in index values 88 of request 84A. To determine whether a bucket identified by an index value is locked, manager module 46 searches for the index value in access table 48. In some examples, manager module 46 may query all index values in access data of access table 48 in parallel. For instance, manager module 46 may query all index values of access table 48 in a single clock cycle.

If, e.g., index value '125' is not included in access table 48, the lock associated with the bucket identified by the index value may be acquired by request 84A. To acquire the lock, manager module 46 selects row identifier 86 and identifies the row 82 of access table 48 that has a row index matching row identifier 86. In the current example, row 82D has a row index that matches row identifier 86. Upon identifying row 82D, manager module 46 identifies access data that includes the index value associated with the bucket for which the lock is requested by request 84A. In the current example, manager module 46 selects access data 72A that matches the index value '125' included in index values 88. To acquire the lock associated with the bucket identified by index value '125,' manager module 46 sets lock bit 78 to '1.'

In another example, if the index value is included in access able 48, manager module 46 further determines whether the lock bit associated with the index value indicates the lock is free. For instance, a lock bit set to a value of '1' indicates the lock is acquired while a lock bit value of '0' indicates the lock is free. If the lock bit indicates the lock is free, manager module 46 causes request 84A to acquire the lock of the bucket identified by the index value. If the lock is not free, manager module 46 cannot acquire the lock identified by the index value and consequently, request 84A must wait to acquire the lock before the control unit can perform operations specified by request 84A. Manager module 46 attempts to acquire locks for each of the buckets identified by index values 88 in request data 94A.

If locks for each of the buckets identified by index values 88 cannot be acquired by request 84A, manager module 46 proceeds to sequentially select the next request 84B in request queue 50. Manager module 46 then determines whether any locks of buckets identified by index values in request 84B may be acquired. Manager module 46 proceeds to attempt to acquire locks for buckets specified by index values in each request of request queue 50.

At a later time, request 84A may acquire locks associated with each of the buckets identified by index values 88. For instance, if manager module 46 determines that each lock requested by request 84A has been acquired, manager module 46 removes request 84A from request queue 50. Upon removing request 84A from request queue 50, control unit 12 executes the operations specified by request 84A. For instance, control unit 12 may perform multiple insert or delete operations specified by request 84A on multiple buckets of data structure 54. For instance, data value 90 is inserted in data structure 54.

Manager module 46 further determines when the operation specified by request 84A has completed. For instance, upon completion of the operations, hash engine 42 generates a lock-free event. The lock-free event includes data that indicates the one or more operations performed on data structure 54 have completed. The lock-free event further includes row identifier 86 of request 84A. Hash engine 42 sends the lock-free event to hash lock manager 24. Manager module 46 receives the lock-free event and sets the element of free map 52 that corresponds to row identifier 86 to '0.' In this way, row 82D is dissociated with row 82D of access table 48. Manager module 46 further clears access data from the row that corresponds to request 84A in access table 48. For instance, access data 72 of row 82D is cleared by manager module 46. Consequently, lock bits and index values stored in access data 72 are cleared and the locks corresponding to the index values are therefore freed. When manager module 46 later queries access table 48 to identify index values specified in another selected request, the locks identified by index values 88 may be acquired by the selected request.

In some examples, manager module 46 refrains from applying lock-free events to access table 48 that arrive while manager module 46 is currently traversing request queue 50. In this way, hash lock manager 24 ensures fairness by preventing requests that are inserted into request queue 50 after earlier requests from obtaining locks requested by the earlier requests. Thus, in some examples, manager module 46 only processes lock-free events, and therefore updates to access table 48, after the request at the tail of request queue 50 has been processed and before the request at the head of request queue 50 is processed. For instance, manager module 46 clears access data 72 of row 82D and dissociates row 84A and request 84D after traversing a tail request, e.g., request 84C, of request queue 50 and before traversing a head request, e.g., request 84A, of request queue 50.

Figure 4:
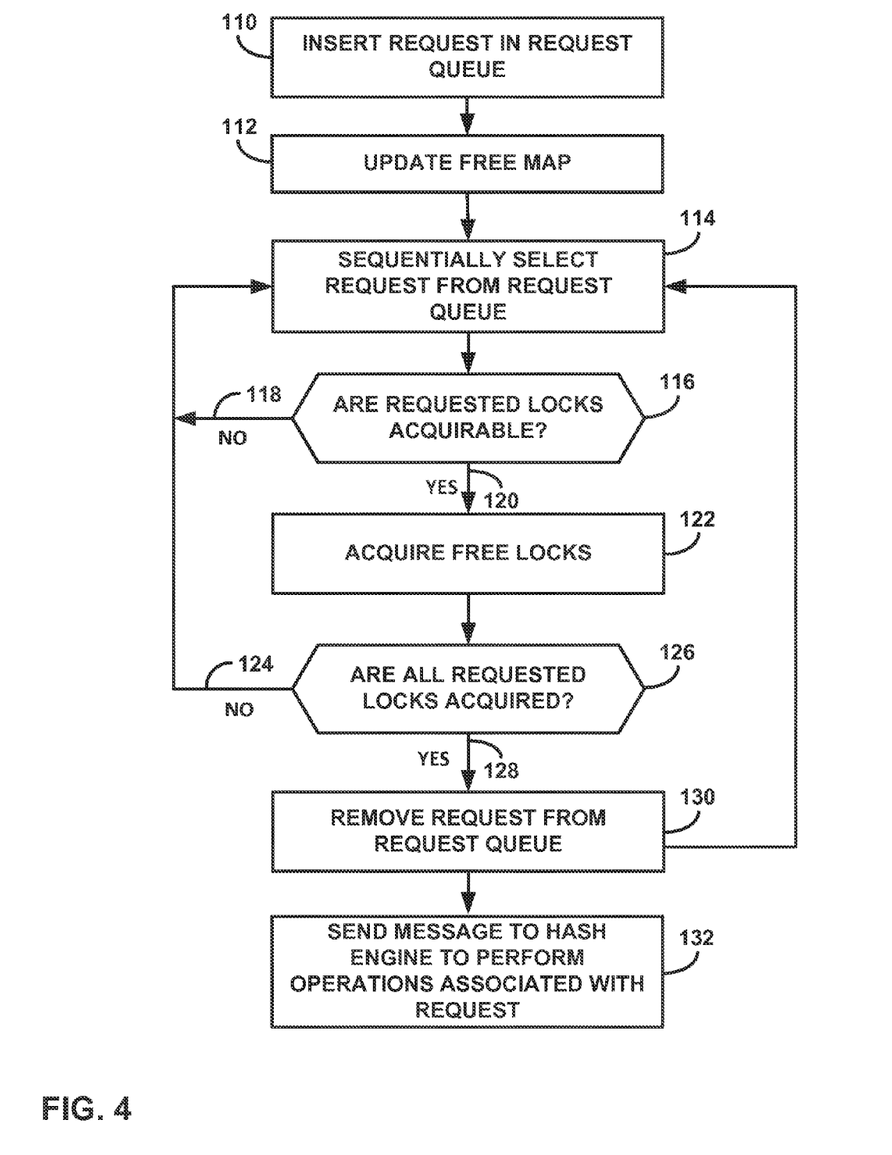
FIG. 4 is a flowchart illustrating an example synchronization operation of a hash lock manager, in accordance with techniques of this disclosure.

FIG. 4 is a flowchart illustrating an example synchronization operation of a hash lock manager, in accordance with techniques of this disclosure. The example operation of FIG. 4 may be performed hash lock manager 22 of computing device 10 as shown in FIG. 2. Initially, software resource 14 generates data 40 and further sends data 40 to hash engine 42 for storage in data structure 54. As previously described herein, hash engine 42 may apply a plurality of hash functions to data 40 to generate a plurality of index values associated with different buckets in data structure 54, one of which may be selected to ultimately store data 40. Hash engine 42 outputs a request 44 that specifies an operation (e.g., read or write) and the generated plurality of index values.

Hash lock manager 22 receives request 22 from hash engine 42 and inserts request 44 into request queue 50 (110). Because request 44 is a new request, it is inserted at the tail of request queue 50. Hash lock manager 22 further associates request 44 with a row of access table 48. Upon associating request 44 with a row of access table 48, manager module 46 updates free map 52 to indicate the row of access table 48 is associated with request 44 (112). Manager module 46 iteratively traverses request queue 50, selecting each request in sequential order to determine if any of the requested buckets specified by the requested are acquirable, i.e., not locked (114).

When manager module 46 selects a request from request queue 50, manager module 46 determines whether locks of buckets identified by index values in request 44 are acquirable, i.e., free (116). If one or more locks are acquirable (120), manager module 46 acquires the free locks for request 44 (122). To acquire free locks, manager module 46 sets lock bits associated with index values stored in access table 48 as described in FIG. 3. For instance, manager module 46 identifies the row of access table 48 that is associated with request 44 and updates the lock bit associated with an index value corresponding to the lock. If no locks are acquirable (116), manager module 46 sequentially selects the next request from request queue 50 (114).

If manager module 46 has acquired one or more locks, manager module 46 further determines whether all of the locks requested by request 44 have been acquired. If all of the locks have not been acquired, manager module 46 sequentially selects the next request in request queue 50 (124). If, however, manager module 46 has acquired all of the locks specified by request 44, manager module 46 removes request 44 from request queue 50 (130). Manager module 46 may send a message to hash engine 42 that indicates all of the locks specified by request 44 have been acquired (132). In some examples, the message may further indicate the one or more operations associated with request 44. Hash engine 42 may subsequently apply the one or more operations associated with request 44 on a subset of portions of data structure 54 that correspond to the acquired locks. For instance, a filter component may select a subset of the candidate portions of data structure 54, and hash engine 42 may perform insert and/or delete operations specified by the request on the subset of selected portions of data structure 54.

After hash engine 42 has finished performing the operations, hash engine 42 generates a lock-free event that is sent to manager module 46. Manager module 46, upon receiving the lock-free event, clears the element of free map 52 that corresponds to request 44. Manager module 46 also clears the row of access table 48 that corresponds to request 44 thereby freeing the locks of buckets identified by index values stored in request 44. In some examples, manager module 46 does not apply the lock-free event until after evaluating the tail of request queue 50 but prior to evaluating the head of request queue 50. Upon freeing the locks, manager module selects the next request from request queue 50.

Figure 5:
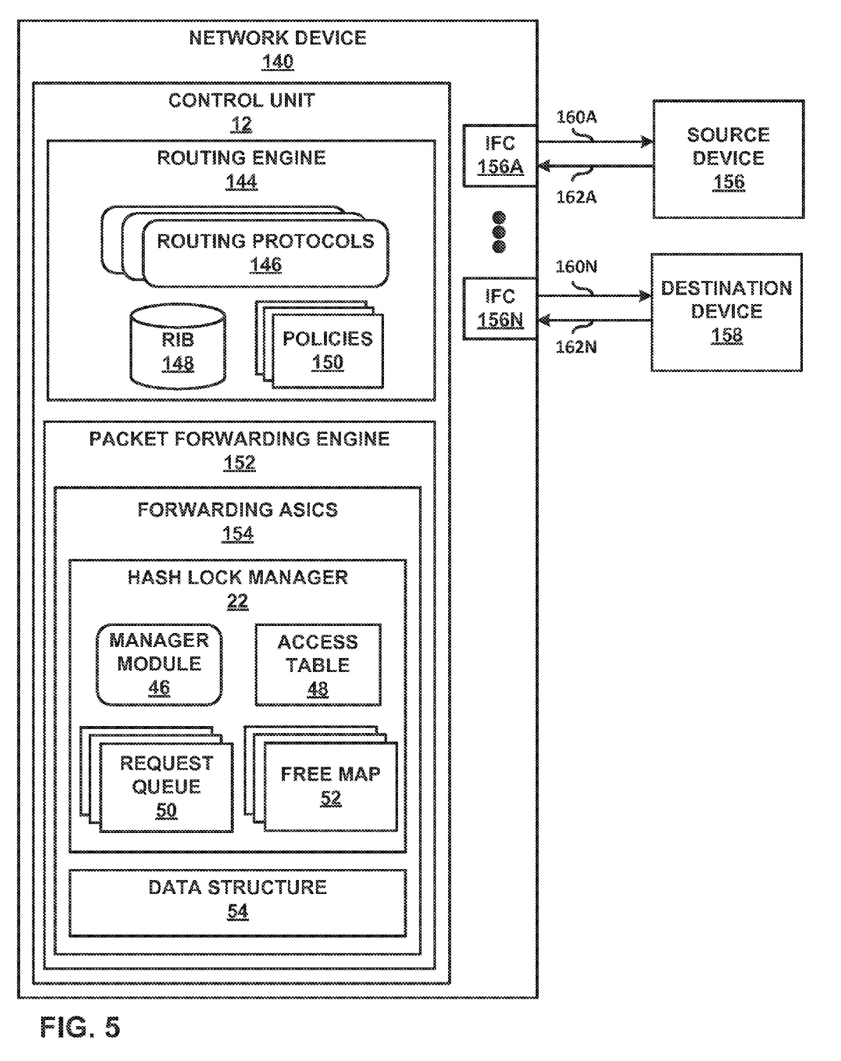
FIG. 5 is a block diagram illustrating an example network device that includes a hash lock manager that operates in accordance with one or more techniques of this disclosure.

FIG. 5 is a block diagram illustrating an example network device 140 that is configured in accordance with one or more techniques of this disclosure. For purposes of illustration, network device 140 may be described below within the context of computing device 10 as shown in the examples of FIGS. 1 and 2. For example, network device 140 may represent an example implementation of computing device 10 of FIGS. 1 and 2. In this example embodiment, network device 140 includes control unit 142 and interface cards 156A-156N (collectively "IFCs 156").

Network device 140 typically include a chassis (not shown in the example of FIG. 5 for ease of illustration purposes) having a number of slots for receiving a set of cards, including IFCs 156 and optionally service physical interface cards. Each card may be inserted into a corresponding slot of a chassis for communicably coupling the card to control unit 12 via a bus, backplane, or other electrical communication mechanism. IFCs 156 send and receive packet flows or network traffic via inbound network links 162A-162N (collectively, "inbound links 162") and outbound network links 160A-160N (collectively, "outbound links 160"). Inbound links 162 and outbound links 160 form common, physical communication media for the IFCs, which operate in full duplex mode. That is, in some examples, each of IFCs 156 is coupled to respective communication media that can send and receive data substantially simultaneously. In other examples, inbound links 162 and outbound links 160 form separate physical media for respective IFCs 156.

Routing engine 144 of control unit 12 may provide the routing functionality of network device 140. In this respect, routing engine 144 may represent hardware or a combination of hardware and software of control unit 12 that implements routing protocols 146. Routing protocols 146 may include, for example, intermediate system to intermediate system (IS-IS), open shortest path first (OSPF), routing information protocol (RIP), border gateway protocol (BGP), or other routing protocols. By executing routing protocols 146, routing engine 144 identifies existing routes through the network and determines new routes through the network. Routing engine 144 stores routing information within routing information base (RIB) 148. The routing information may include information defining a topology of a network through which network device 140 routes network packets. Routing engine 144 may resolve the topology defined by the routing information to select or determine one or more routes through the network.

Routing engine 144 may then update packet forwarding engine (PFE) 152 in accordance with these routes. The forwarding information associates keying information, e.g., IP addresses or IP prefixes or labels with next hops (e.g., neighboring routers) and ultimately with output interfaces of network device 144 coupled to outbound links 160. When forwarding a packet, PFE 152 processes a key extracted from the packet's header to traverse the forwarding information stored in PFE 152 and selects a next hop to which to forward the packet. Based on the selected next hop, PFE 152 identifies the set of one or more outbound links 160 that are coupled to the next hop.

As shown in FIG. 5, PFE 152 further includes hash lock manager 22 and data structure 54. Hash lock manager 22 may be hash lock manager 22 as described in FIGS. 1-4. Hash lock manager 22 further includes manager module 46, access table 48, request queue 50, and free map 52. As shown in FIG. 5, in some examples, hash lock manager 22 and data structure 54 may be implemented in forwarding ASICS (154). Forwarding ASICs 154 may comprise one or more dedicated packet forwarding integrated circuits. In one example, forwarding ASICS 154 include content addressable memory (CAM). CAM comprises semiconductor memory and comparison circuitry that enables multiple operations performed on multiple portions of data structure 54 to complete in a single clock cycle.

In some examples, network device 140 maintains one or more data structures 54 that are implemented as hash tables. For instance, data structure 54 may store network routes, i.e., a defined pair of addresses such as a destination and gateway associated with a packet flow. In other examples, data structure 54 may store next hops of configured network routes. In some examples, techniques of the present disclosure may be used to implement a Bloom filter. One example implementation of Bloom filters in network devices using hash tables is described in U.S. patent application Ser. No. 13/239,774, entitled "DYNAMICALLY ADJUSTING HASH TABLE CAPACITY," by John Keen et al., filed Sep. 22, 2011, incorporated herein by reference. More generally, data structure 54 may be used in any instance where a hash table is required. In each example, hash lock manager 22 applies the synchronization techniques of the present disclosure to synchronize concurrent access to multiple portions of a data structure 54 as shown in FIGS. 1-4.

Various embodiments of the invention have been described. These and other embodiments are within the scope of the following claims.

The invention claimed is:

1. A method comprising:
sequentially selecting, by a computing device, a plurality of requests from a request queue, wherein at least one request of the plurality of requests specifies a plurality of requested synchronization objects, the requested synchronization objects corresponding to different non-contiguous candidate portions dispersed in a data structure to which to apply operations, wherein each of the plurality of requested synchronization objects for each of the corresponding candidate portions must be acquired to apply the operations for the at least one request on the corresponding candidate portions of the data structure;
responsive to determining that a first subset of the plurality of requested synchronization objects has been previously acquired by the at least one request, querying, by the computing device, one or more sets of identifiers to determine whether a second subset of the plurality of requested synchronizations objects not previously acquired by the at least one request are acquirable, wherein each respective identifier of one or more sets of identifiers identifies a respective synchronization object of the plurality of requested synchronization objects;
acquiring, by the computing device, any of the second subset of the plurality of requested synchronization objects that are acquirable; and
responsive to acquiring all of the requested synchronization objects in the first and second subsets, selecting, by the computing device, the candidate portions of the data structure and applying the operations only to the candidate portions.

2. The method of claim 1,
wherein the data structure comprises a hash table;
wherein the candidate portions of the data structure comprise buckets of the hash table; and
wherein the requested synchronization objects comprise locks that correspond to the buckets of the hash table.

3. The method of claim 1, wherein at least one of the operations of the at least one request comprises at least an insert operation to insert the data element into the selected candidate portions of the data structure or a delete operation to delete the data element from the selected candidate portions of the data structure.

4. The method of claim 1, further comprising:
receiving, by the computing device, the at least one request; and
storing, by the computing device, the at least one request at a tail of the request queue.

5. The method of claim 1, wherein sequentially selecting the at least one request from the request queue that includes a plurality of requests further comprises traversing the request queue from a head of the request queue to a tail of the request queue.

6. The method of claim 1, wherein querying one or more sets of identifiers to determine whether the second subset of the requested synchronizations objects not previously acquired by the at least one request are acquirable further comprises:
selecting, by the computing device, an index value from the at least one request, wherein the index value identifies a candidate portion of the multiple candidate portions of the data structure;
comparing, by the computing device, the index value to each identifier of the one or more sets of identifiers to identify a match between the index value and at least one identifier of the one or more sets of identifiers; and determining, by the computing device, a requested synchronization object of the one or more specified synchronization objects identified by the index value is acquirable if the index value matches at least one identifier of the one or more sets of identifiers.

7. The method of claim 6, wherein comparing the index value to each identifier of the one or more sets of identifiers to identify the match between the index value and at least one identifier of the one or more sets of identifiers further comprises;
comparing, by the computing device, the index value to each identifier of the one or more sets of identifiers in parallel to identify the match between the index value and at least one identifier of the one or more sets of identifiers.

8. The method of claim 1, wherein the identifiers that identify the synchronization objects are stored as data in rows of a table, and wherein each row of the table is associated with a unique request of the request queue.

9. The method of claim 8, further comprising:
receiving, by the computing device, an event that indicates the operations of the at least one request executing concurrently on the multiple portions of the data structure have completed;
responsive to receiving the event, clearing, by the computing device, data of the row of the table associated with the at least one request; and
dissociating, by the computing device, the at least one request and the row of the table associated with the at least one request.

10. The method of claim 9, further comprising:
clearing data of the row of the table associated with the at least one request and dissociating the row of the table associated with the at least one request and the at least one request after traversing a tail request of the request queue and before traversing a head request of the request queue.

11. The method of claim 10, wherein the event includes data identifying the multiple candidate portions of the data structure.

12. The method of claim 1, wherein acquiring any of the second subset of the requested synchronization objects that are acquirable further comprises:
setting, by the computing device, indicators associated with each of the requested synchronizations objects that indicate that each of the requested synchronization objects are acquired.

13. The method of claim 1, wherein the computing device comprises a network device.

14. The method of claim 1, wherein the at least one request is a first request of the plurality of requests, the candidate portions are first candidate portions, and the plurality of requested synchronization objects is a first plurality of requested synchronization objects, the method further comprising:
responsive to querying the one or more sets of identifiers to determine whether one or more of the first plurality of requested synchronizations objects specified by the first request are acquirable, determining that all of the first plurality of requested synchronizations objects specified by the first request are not acquirable;
after determining that all of the first plurality of requested synchronizations objects specified by the first request are not acquirable, querying the one or more sets of identifiers to determine whether one or more of a second plurality of requested synchronizations objects specified by a second request that is queued after the first request are acquirable, each of the second plurality of requested synchronizations objects being different than each of the first plurality of requested synchronizations objects;
before acquiring all of the first plurality of requested synchronization objects and responsive to determining that all of the second plurality of requested synchronizations objects specified by the second request are acquirable, acquiring, by the computing device, all of the second plurality of requested synchronization objects; and
responsive to acquiring all of the second plurality of requested synchronization objects, applying, by the computing device, an operation of the second request only to second candidate portions that correspond to the second plurality of requested synchronization objects.

15. A computing device comprising:
a control unit having one or more hardware-based microprocessors; and
a manager module executable by the microprocessors,
wherein the manager module sequentially selects a plurality of requests from a request queue, wherein at least one request of the plurality of requests specifies a plurality of requested synchronization objects, the requested synchronization objects corresponding to different non-contiguous candidate portions dispersed in a data structure to which to apply operations, wherein each of the plurality of requested synchronization objects for each of the corresponding candidate portions must be acquired to apply the operations for the at least one request on the corresponding candidate portions of the data structure;
wherein the manager module, responsive to determining that a first subset of the plurality of requested synchronization objects has been previously acquired by the at least one request, queries one or more sets of identifiers to determine whether a second subset of the plurality of requested synchronizations objects not previously acquired by the at least one request are acquirable, wherein each respective identifier of one or more sets of identifiers identifies a respective synchronization object of the plurality of requested synchronization objects;
wherein the manager module acquires any of the second subset of the plurality of requested synchronization objects that are acquirable; and
wherein responsive to acquiring all of the requested synchronization objects in the first and second subsets, selecting, by the computing device, the candidate portions of the data structure and applying the operations only to the candidate portions.

16. The computing device of claim 15,
wherein the data structure comprises a hash table;
wherein the candidate portions of the data structure comprise buckets of the hash table; and
wherein the requested synchronization objects comprise locks that correspond to the buckets of the hash table.

17. The computing device of claim 15, wherein at least one of the operations of the at least one request comprises at least an insert operation to insert the data element into the selected candidate portions of the data structure or a delete operation to delete the data element from the selected candidate portions of the data structure.

18. The computing device of claim 15,
wherein the manager module receives the at least one request and stores the at least one request at a tail of the request queue.

19. The computing device of claim 15, wherein the manager module sequentially selects the at least one request from the request queue that includes a plurality of requests further comprises traversing the request queue from a head of the request queue to a tail of the request queue.

20. The computing device of claim 15,
   wherein the manager module selects an index value from the at least one request, wherein the index value identifies a candidate portion of the multiple candidate portions of the data structure;
   wherein the manager module compares the index value to each identifier of the one or more sets of identifiers to identify a match between the index value and at least one identifier of the one or more sets of identifiers; and
   wherein the manager module determines a requested synchronization object of the one or more specified synchronization objects identified by the index value is acquirable if the index value matches at least one identifier of the one or more sets of identifiers.

21. The computing device of claim 20,
   wherein the manager module compares the index value to each identifier of the one or more sets of identifiers in parallel to identify the match between the index value and at least one identifier of the one or more sets of identifiers.

22. The computing device of claim 15,
   wherein the identifiers that identify the synchronization objects are stored as data in rows of a table, and wherein each row of the table is associated with a unique request of the request queue.

23. The computing device of claim 22,
   wherein the manager module receives an event that indicates the operations of the at least one request executing concurrently on the multiple portions of the data structure have completed;
   wherein the manager module, responsive to receiving the event, clears data of the row of the table associated with the at least one request; and
   wherein the manager module dissociates the at least one request and the row of the table associated with the at least one request.

24. The computing device of claim 23,
   wherein the manager module clears data of the row of the table associated with the at least one request and dissociates the row of the table associated with the at least one request and the at least one request after traversing a tail request of the request queue and before traversing a head request of the request queue.

25. The computing device of claim 15,
   wherein the manager module sets indicators associated with each of the requested synchronizations objects that indicate that each of the requested synchronization objects are acquired.

26. The computing device of claim 15 wherein the event includes data identifying the multiple candidate portions of the data structure.

27. The computing device of claim 15, wherein the computing device comprises a network device.

28. A non-transitory computer-readable memory comprising instruction that, when executed, cause one or more processors to:
   sequentially select a plurality of requests from a request queue, wherein at least one request of the plurality of requests specifies a plurality of requested synchronization objects, the requested synchronization objects corresponding to different non-contiguous candidate portions dispersed in a data structure to which to apply operations, wherein each of the plurality of requested synchronization objects for each of the corresponding candidate portions must be acquired to apply the operations for the at least one request on the corresponding candidate portions of the data structure;
   responsive to determining that a first subset of the plurality of requested synchronization objects has been previously acquired by the at least one request, query one or more sets of identifiers to determine whether a second subset of the plurality of requested synchronizations objects not previously acquired by the at least one request are acquirable, wherein each respective identifier of one or more sets of identifiers identifies a respective synchronization object of the plurality of requested synchronization objects;
   acquire any of the second subset of the plurality of requested synchronization objects that are acquirable; and
   responsive to acquiring all of the requested synchronization objects in the first and second subsets, selecting the candidate portions of the data structure and applying the operations only to the candidate portions.

29. A computing device comprising:
   a control unit having one or more hardware-based microprocessors;
   a manager module executable by the microprocessors;
   a hash engine configured to apply a plurality of hashing functions to a data element to generate a plurality of identifiers that identify different non-contiguous candidate portions dispersed in a hash table to which to write the data element;
   wherein the manager module sequentially selects a plurality of requests from a request queue, wherein at least one request of the plurality of requests specifies a plurality of locks, each of the requested locks corresponding to a different candidate portion of the hash table to which to apply an operation, wherein each of the plurality of requested locks for each of the corresponding candidate portions must be acquired to apply the operation for the at least one request on the subset of the corresponding candidate portions of the data structure;
   wherein the manager module, responsive to determining that a first subset of the plurality of requested locks has been previously acquired by the at least one request, queries one or more sets of identifiers to determine whether a second subset of the plurality of requested locks not previously acquired by the at least one request are acquirable, wherein each respective identifier of the one or more sets of identifies a respective lock of the plurality of requested locks;
   wherein the manager module acquires any of the second subset of the plurality of requested locks that are acquirable;
   and
   a filter component that, responsive to acquiring all of the requested locks in the first and second subsets, selects, by the microprocessors, the candidate portions of the hash table and writes the data element only to the candidate portions.

* * * * *